United States Patent

Miyanaga et al.

[11] Patent Number: 6,001,759
[45] Date of Patent: Dec. 14, 1999

[54] SILICON NITRIDE SINTERED BODY, METHOD OF PREPARING THE SAME AND NITRIDED COMPACT

[75] Inventors: Michimasa Miyanaga; Seiji Nakahata; Akira Yamakawa, all of Itami, Japan

[73] Assignee: Sumitomo Electric Industries, Ltd., Osaka, Japan

[21] Appl. No.: 09/144,116

[22] Filed: Aug. 31, 1998

[30] Foreign Application Priority Data

Sep. 9, 1997 [JP] Japan .................................. 9-243597

[51] Int. Cl.$^6$ ...................... C04B 35/591; C04B 35/599
[52] U.S. Cl. ..................... 501/97.2; 501/97.3; 501/98.2; 264/647; 264/683
[58] Field of Search ................... 501/97.2, 97.3, 501/98.2; 264/647, 683

[56] References Cited

U.S. PATENT DOCUMENTS

| | | | |
|---|---|---|---|
| 4,351,787 | 9/1982 | Martinengo et al. | 264/647 |
| 5,032,553 | 7/1991 | Tarry | 501/98.2 |
| 5,055,432 | 10/1991 | Edler et al. | 501/97.2 |
| 5,166,106 | 11/1992 | Edler et al. | 501/97.2 |
| 5,204,297 | 4/1993 | Yamamoto et al. | 501/97.3 |
| 5,275,772 | 1/1994 | Yamamoto et al. | 501/97.3 |
| 5,387,562 | 2/1995 | Dillinger et al. | 501/97.2 |
| 5,468,696 | 11/1995 | Ishizawa et al. | 501/98.2 |
| 5,672,553 | 9/1997 | Mitomo et al. | 501/97.3 |
| 5,756,411 | 5/1998 | Nakahata et al. | 501/97.2 |

FOREIGN PATENT DOCUMENTS

| | | |
|---|---|---|
| 56-22678 | 3/1981 | Japan . |
| 62-3074 | 1/1987 | Japan . |
| 63-103867 | 5/1988 | Japan . |
| 1-100064 | 4/1989 | Japan . |
| 8-245267 | 9/1996 | Japan . |
| 8-310868 | 11/1996 | Japan . |

*Primary Examiner*—Karl Group
*Attorney, Agent, or Firm*—W. F. Fasse; W. G. Fasse

[57] ABSTRACT

A silicon nitride sintered body prepared through a nitriding reaction of Si, consists of crystal grains mainly composed of silicon nitride and/or SIALON and a grain boundary phase. The grain boundary phase includes a first component including at least one element selected from a group of Na, K, Mg, Ca and Sr and a second component including at least one element selected from a group of Y and lanthanoid series elements. The molar ratio of the first component to the second component is in the range of 1:1 to 6:1 in terms of oxides. The mean breadth and the mean length of the crystal grains are not more than 0.1 $\mu$m and not more than 3 $\mu$m respectively, and the standard deviation of the mean length in the sintered body is within 1.5 $\mu$m. Especially, the mean breadth of the crystal grains is at least 0.4 $\mu$m and not more than 0.9 $\mu$m.

19 Claims, 1 Drawing Sheet

SILICON NITRIDE SINTERED BODY, METHOD OF PREPARING THE SAME AND NITRIDED COMPACT

BACKGROUND OF THE INVENTION

1. Field of the Invention

The present invention relates to a silicon nitride sintered body which is useful as an automobile part or a structural part for a device such as an OA apparatus, can be prepared at a lower cost than that prepared by a conventional method and has excellent mechanical strength and abrasion resistance particularly at ordinary temperatures, and relates to a method of preparing the same.

2. Description of the Prior Art

Silicon nitride ceramics, which are lightweight as compared with general metals and superior in heat resistance, wear resistance, mechanical strength and toughness as compared to other ceramic materials, are extremely balanced materials applicable to various structural parts. Therefore, the development of the applications of such silicon nitride ceramics has progressed as to such materials being used as an engine part for an automobile or a structural part for an apparatus such as an OA apparatus.

Silicon nitride ceramics are mainly prepared by two methods. The first method is adapted to sinter a raw material of $Si_3N_4$ powder with addition of a sintering aid, and the second method is adapted to nitride and sinter a raw material of Si powder with addition of a similar sintering aid. The second method is industrially advantageous as compared with the first method since the material cost is reduced due to employment of the low-priced Si powder in place of $Si_3N_4$ powder in view of a small machining allowance in final working resulting from small shrinkage and deformation in sintering. When silicon nitride ceramics are prepared by the second method under conditions substantially identical to those for the first method, however, it is difficult to obtain a homogeneous and dense sintered body since unnitrided Si grains or voids tend to remain in the sintered body. Thus, the second method is inferior in practicality to the first method.

In relation to the second method, therefore, a number of attempts have been made for obtaining powder or a nitrided compact having excellent sinterability with no residue of unnitrided Si grains either by heating a raw material in a high-pressure nitrogen gas atmosphere or nitriding or sintering the raw material over an extremely long time for completely nitriding the same.

For example, Japanese Patent Publication No.61-38149 (1986) (Japanese Patent Laying-Open No. 56-22678) discloses a reactive sintering method of adding powder of at least one sintering assistant selected from a group of compounds of elements belonging to the groups IIa, IIIa, IIIb, IVa and Va of the periodic table to Si powder, shaping the obtained mixture, thereafter nitriding the same in a nitrogen atmosphere of 1200 to 1450° C. for obtaining a nitrided compact of 75 to 80 percent in relative density, and thereafter sintering the nitrided compact in a pressurized nitrogen atmosphere of 1600 to 2200° C. Obtained according to this method is a silicon nitride sintered body consisting of fibrous crystal grains of 0.5 to 2 μm in mean grain size and having bending strength of about 600 to 800 MPa. On the other hand, Japanese Patent Publication No. 7-45345 (1995) (Japanese Patent Laying-Open No. 1-100064) discloses a method of shaping mixed powder prepared by adding subsidiary component powder consisting of at least either $Nd_2O_3$ or $Sm_2O_3$ and $Y_2O_3$ to main component powder of Si powder or a mixture of Si powder and $Si_3N_4$ powder, nitriding the mixed powder in a nitrogen atmosphere at 1000 to 1500° C. and thereafter sintering the nitrided powder in pressurized nitrogen gas at 1600 to 2200° C. According to an Example, a silicon nitride sintered body having bending strength of about 550 to 920 MPa has been obtained. In either method, however, no dense sintered body can be obtained unless the material is finally sintered in a high-pressure nitrogen gas atmosphere or subjected to hot isostatic pressing (HIP).

Japanese Patent Publication No. 6-33173 (1994) (Japanese Patent Laying-Open No. 62-3074) discloses. a method of previously crushing an alloy of Si powder and a group IIIa element metal and melting/nitriding the alloy at 1250 to 1450° C. for preparing an Si-group IIIa nitride having a small content of residual Si, further crushing the nitride, thereafter adding and mixing $Si_3N_4$ powder and a compound of an element belonging to the group IIa, IIIa or IIIb of the periodic table to and with the nitride and sintering the obtained compact. According to an Example, a silicon nitride sintered body having bending strength of about 700 to 1100 MPa has been obtained. Japanese Patent Laying-Open No. 63-103867 (1988) also discloses a similar method. While either method is adapted to previously improve the affinity between the Si powder and sintering assistant powder for improving sinterability, extremely complicated steps are required for preparing the compact, to result in a considerably high cost. In either method, further, at least 80 percent by weight of $Si_3N_4$ powder must be mixed in the step of nitriding the alloy of Si and the metal in order to suppress heat generation, and a cost merit resulting from reactive sintering is small.

Further, Japanese Patent Laying-Open No. 8-245267 (1996) discloses a method of heat-treating commercially available Si powder in a non-nitrogen atmosphere at 300 to 800° C. for previously forming holes in Si grains, adding sintering assistant powder consisting of at least one material selected from a group of compounds of rare earth elements and Al, Mg and Ca by 0.1 to 15 mole percent in terms of the elements and at least one hole forming agent selected from a group of compounds of Sc, Ni, V, Cr, Mn, Fe, Co, Cu, Ti, Zn, Ga and Ge by 0.5 to 15 mole percent to the powder, mixing the materials with each other and thereafter nitriding the mixture in a nitrogen atmosphere at 1300 to 1400° C. for preparing a nitrided compact, and sintering the nitrided compact at 1500 to 1800° C. According to an Example, a silicon nitride sintered body having bending strength of about 800 to 1400 MPa has been obtained. In addition, Japanese Patent Laying-Open No. 8-310868(1996) discloses a similar method of previously chemically treating commercially available Si powder and thereafter heat-treating the same in a non-nitrogen atmosphere at 300 to 800° C. However, either of these methods, which requires specific treatment of the material powder, cannot be carried out at a low cost.

SUMMARY OF THE INVENTION

An object of the present invention is to provide a novel silicon nitride sintered body having excellent mechanical strength and wear resistance by a reactive sintering method which can solve the aforementioned problems for reducing the preparation cost.

The present invention is directed to a silicon nitride sintered body obtained by nitriding and sintering silicon (hereinafter referred to as Si), which consists of crystal grains mainly composed of silicon nitride (hereinafter referred to as $Si_3N_4$) and/or SIALON and a grain boundary phase. The grain boundary phase consists of a first component including at least one element selected from a group of sodium (hereinafter referred to as Na), potassium (hereinafter referred to as K), magnesium (hereinafter referred to as Mg), calcium hereinafter referred to as Ca) and strontium (hereinafter referred to as Sr) and a second component including at least one element selected from a group of yttrium (hereinafter referred to as Y) and lanthanoid series elements (hereinafter referred to as La). The molar ratio of the first component to the second component is in the range of 1:1 to 6:1 in terms of oxides thereof, the mean breadth and the mean length of silicon nitride crystal grains are not more than 1 μm and not more than 3 μm respectively, and the standard deviation of the mean length in the sintered body is within 1.5 μm. Especially, the mean breadth of the crystal grains is at least 0.4 μm.

The term "silicon nitride sintered body" indicates a sintered body mainly composed of $Si_3N4$ and/or SIALON, and the term "silicon nitride crystal grains" indicates crystal grains composed of $Si_3N_4$ and/or SIALON. Further, the terms "mean breadth" and "mean length" of the crystal grains indicate arithmetic mean values of the shortest and the longest outer diameters of the crystal grains existing in an arbitrary two-dimensional section of the sintered body respectively.

The present invention provides a nitrided compact such that $Si_3N_4$ grains resulting from nitriding reaction of Si are spherical and the mean grain size thereof is smaller than that of the unnitried starting material Si, as an intermediate for obtaining the aforementioned silicon nitride sintered body. The present invention also provides a nitrided compact such that at least 80 percent of a crystal phase of the main component of $Si_3N_4$ is an α-crystal phase.

A method of preparing the aforementioned silicon nitride sintered body according to the present invention is as follows: In a first step, Si powder of a quantity corresponding to 75 to 98 percent by weight in terms of $Si_3N_4$ and 2 to 25 percent by weight of powder having the following composition are weighed as main component powder and subsidiary component powder respectively and mixed with each other. The subsidiary component powder consists of a first compound containing at least one element selected from a group of Na, K, Mg, Ca and Sr and a second compound containing at least one element selected from a group of Y and La series elements, and is so weighed that the molar ratio of the first compound to the second compound is in the range of 1:1 to 6:1 in terms of oxides thereof. In a second step, the mixed powder of the Si powder serving as the main component powder and the subsidiary component powder is shaped to form a compact. In a third step, the obtained compact is primarily nitrided in a non-oxidizing atmosphere containing nitrogen in a temperature range of 1200 to 1320° C. and then secondarily nitrided in the atmosphere in a temperature range of 1350 to 1400° C. for preparing a nitrided compact. In a fourth step, the nitrided compact is sintered in the non-oxidizing atmosphere containing nitrogen in a temperature range of 1600 to 1800° C.

In the aforementioned steps, the main component powder may have a mixed composition of not more than 30 percent by weight of $Si_3N_4$ powder and the rest of Si powder.

In the primary and secondary nitriding step and the sintering step, the quantity of carbon monoxide (hereinafter referred to as CO) gas contained in the atmosphere is preferably rendered not more than 1000 ppm.

The foregoing and other objects, features, aspects and advantages of the present invention will become more apparent from the following detailed description of the present invention when taken in conjunction with the accompanying drawing.

DESCRIPTION OF THE PREFERRED EMBODIMENTS

Figure 1:
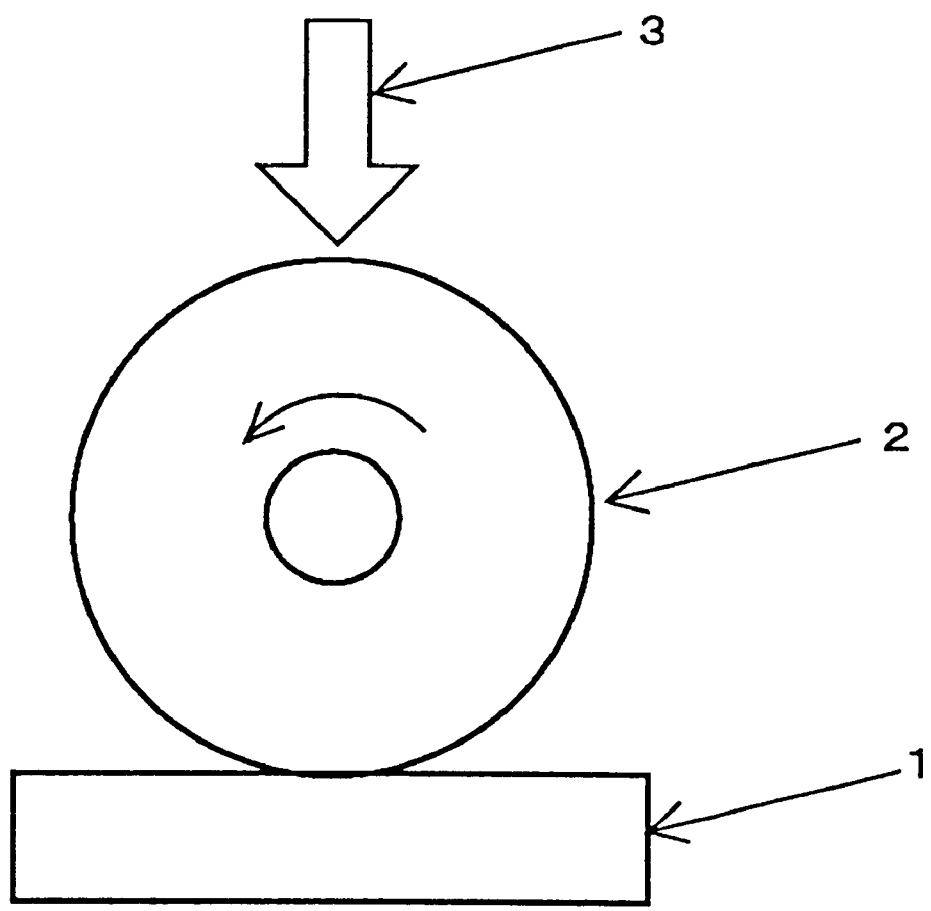
FIG. 1 typically illustrates a wear test in Example 4 of the present invention.

The present invention provides a silicon nitride sintered body prepared by selecting specific components for the subsidiary component and mixing the same with each other in a specific ratio, as described above. The silicon nitride sintered body according to the present invention may further contain another subsidiary component such as alumina (hereinafter referred to as $Al_2O_3$) or aluminum nitride (hereinafter referred to as AlN), in addition to these components. These components may be finally solidly dissolved in silicon nitride serving as the main component in the process up to sintering, depending on the combination and the quantity ratio thereof. $Al_2O_3$ or AlN may be solidly dissolved by a specific quantity to form a crystal phase of SIALON. If the components are particularly fine, the components may be finally partially or entirely incorporated into the interiors of silicon nitride and/or SIALON crystal grains forming the main component in the process up to sintering. However, the components generally exist in grain boundaries of the main component crystal grains, except the parts solidly dissolved in the silicon nitride.

Therefore, the silicon nitride sintered body according to the present invention contains at least one element selected from the group of Na, K, Mg, Ca and Sr and at least one element selected from the group of Y and lanthanoid series elements. $A_2O_3$ or AlN contained in the sintered body may react with $Si_3N_4$ to form a main crystal phase of SIALON, as the case may be. While the components may be partially incorporated into the crystal grains of SIALON or $Si_3N_4$ as single components or reactants with other components, most parts exist in the grain boundaries of the sintered body as a glass phase or a crystal phase containing the elements and Si, N and O. In the sintered body, the abundance ratio (molar ratio) of the first component to the second component is in the range of 1:1 to 6:1 in terms of oxides thereof. It is possible to obtain a silicon nitride sintered body having such fine and homogeneous grain size distribution that the mean breadth and the mean length of crystal grains are not more than 1 μm and not more than 3 μm respectively and the standard deviation of the mean length in the sintered body is within 1.5 μm, preferably within 1 μm, by preparing the specific components in the specific quantity ratio and carrying out the aforementioned nitriding and sintering steps.

Due to the structure of the subsidiary component, the Si grains are readily refined in nitriding reaction, to readily form fine and sintering-active spherical $Si_3N_4$ grains after nitriding. In other words, obtained is a nitrided compact wherein the $Si_3N_4$ grains resulting from nitriding reaction are spherical and the mean grain size thereof is smaller than that of the unnitrided Si grains. As a desirable form of the nitrided compact, at least 80 percent of a crystal phase of the main component of $Si_3N_4$ may be an α-crystal phase. Such a nitrided compact serves as an intermediate, to be capable of readily forming the aforementioned silicon nitride sintered body having fine and homogeneous grain size distribution.

The method of preparing the silicon nitride sintered body according to the present invention is now described. In the method of preparing the silicon nitride sintered body according to the present invention, Si powder is weighed in a quantity corresponding to 75 to 98 percent by weight in terms of $Si_3N_4$ as the main component powder and the powder having the following contents is weighed by 2 to 25 percent by weight as the subsidiary component powder, and mixed with each other in the first step. In this case, the Si powder serving as the main component powder is preferably not more than 25 $\mu$m in mean grain size, since the nitriding reaction may not sufficiently progress in the nitriding step if the mean grain size of the Si powder exceeds 25 $\mu$m. The Si powder serving as the main material is partially replaced with $Si_3N_4$ and blended, for controlling the nitriding reaction in an initial stage of the nitriding step, accelerating the nitriding reaction and simplifying formation of spherical $\alpha$-phase $Si_3N_4$ fine grains improving sinterability after nitriding. The quantity of replacement may be up to 30 percent by weight, to attain a sufficient effect. When the Si powder is replaced with $Si_3N_4$ in excess of 30 percent by weight, no further effect is attained but the material cost is disadvantageously increased.

The first component forming the subsidiary component is a first compound containing at least one element selected from the group of Na, K, Mg, Ca and Sr. The second component is a second compound containing at least one element selected from the group of Y and lanthanoid series elements. The first and second compounds are so mixed with each other that the molar ratio of the first compound to the second compound is in the range of 1:1 to 6:1 in terms of oxides thereof.

The main component powder and the subsidiary component powder are weighed and mixed with each other as follows: First, the Si powder is weighed out to a quantity corresponding to 75 to 98 percent by weight in terms of $Si_3N_4$ in molar ratio. If the quantity corresponds to 90 percent by weight, for example, the weighed quantity of the Si powder is calculated in a calculation formula of $3Si/Si_3N_4$ (molecular weight ratio; about 0.60)×90 percent by weight. The subsidiary component powder is so weighed out that the total quantity in terms of the oxides is (100–X) percent by weight with respect to the specific quantity X of the main component in the range of 75 to 98 percent by weight in terms of $Si_3N_4$ in molar ratio. The main component powder and the subsidiary component powder are mixed with each other by a well-known method.

The total quantity of the subsidiary component is set in the aforementioned range since it is difficult to form fine spherical $Si_3N_4$ grains in the nitriding stage if the quantity is less than the lower limit of this range. If the total quantity of the subsidiary component is less than the lower limit of the aforementioned range, unnitrided Si may be left or a number of voids may be formed in the obtained silicon nitride sintered body, to result in an unpractical sintered body. If the total quantity of the subsidiary component exceeds the upper limit of the aforementioned range, on the other hand, the bending strength of the obtained silicon nitride sintered body is unpreferably reduced although the nitriding sufficiently progresses. In the subsidiary component, the ratio of the first component to the second component is set in the aforementioned range for the following reason: If the ratio is less than 1:1, i.e., if the quantity of the first component is less than 50 mole percent in terms of the oxide, crystal nuclei serving as the precursor for readily sinterable fine spherical $\alpha$-phase $Si_3N_4$ grains cannot be ensured in sufficient density in an initial nucleation stage of the nitriding step. If the ratio exceeds 6:1, i.e., if the quantity of the second component is less than about 33.3 mole percent in terms of the oxide, on the other hand, the nuclei of $Si_3N_4$ formed in the nucleation stage are not refined in a later stage of the nitriding step but it is difficult to form sintering-active fine spherical $\alpha$-phase $Si_3N_4$ grains. Thus, a readily sinterable nitrided compact cannot be obtained in either case.

In the subsidiary component according to the present invention, as hereinabove described, the first and second components are mainly adapted to control nucleation in the initial stage of nitriding and nitriding, reaction after the nucleation, respectively. The compound forming the first component reacts with oxide layers mainly composed of $SiO_2$ which are bonded with surfaces of the Si grains in a bridged state, for parting the bonds and bringing the oxide layers into a non-bridged state. Consequently, diffusion of nitrogen from the surfaces to the interiors of the Si grains as well as formation of a number of crystal nuclei of $\alpha$-phase $Si_3N_4$ on the grain surfaces are facilitated at relatively low temperature, to simplify formation of fine spherical $\alpha$-phase $Si_3N_4$ crystal grains during the progress of nitriding.

The compound forming the second component moves into the interiors of the unnitrided Si grains or to the surfaces thereof in a next stage of further progress of the nitriding. The metal element forming the compound has a large covalent radius, to readily form a number of atomic vacancies in the Si grains after the movement. Thus, consecutively urged is diffusion of nitride atoms from the surfaces to the interiors of the Si grains or that of Si atoms from the interiors to the surfaces through the vacancies. At this time, the Si atoms diffused through the vacancies successively react with peripheral portions of the aforementioned nuclei of $\alpha$-phase $Si_3N_4$ immediately after formation thereof, whereby the Si grains are nitrided and form fine grains. Thus obtained is a nitrided compact containing a large quantity of $\alpha$-phase $Si_3N_4$ grains which are smaller in grain size and distribution width than the first main component grains (Si grains). Therefore, the nitrided compact is so readily sinterable that the time required for nitriding and sintering can be reduced as compared with the conventional method and nitriding need not be accelerated with a load of a high nitrogen gas pressure.

In order to sufficiently facilitate the aforementioned role of the subsidiary component, the third step, i.e., the nitriding step of the inventive method is carried out in two stages. The first stage, corresponding to the aforementioned nucleation stage, is carried out in a normal pressure non-oxidizing atmosphere containing nitrogen in the temperature range of 1200 to 1320° C. This process is referred to as a primary nitriding step, as described above. The treatment time, varying with the temperature, is generally set at 1 to 5 hours. If the temperature in the primary nitriding step is less than the lower limit of the aforementioned range, the rate of the aforementioned nitriding reaction is rapidly reduced to spoil the inventive effect of reducing the nitriding time. If the temperature in the primary nitriding step exceeds the upper limit of the aforementioned range, on the other hand, the formation density of the $\alpha$-phase $Si_3N_4$ crystal nuclei is reduced to grow the nitrided grain abnormally, and hence a readily sinterable refined silicon nitride grains cannot be obtained.

The second stage, corresponding to the nitriding progress stage, is carried out in the normal pressure non-oxidizing atmosphere containing nitrogen in the temperature range of 1350 to 1400° C. This process is referred to as a secondary nitriding step, as described above. The treatment time, varying with the temperature, is generally set at about 1 to 5 hours. If the temperature in the secondary nitriding step is less than the lower limit of the aforementioned range, the speed of nitriding into the grains is reduced. Thus, the time required for homogeneous nitriding is remarkably increased. If the temperature in the secondary nitriding step exceeds the upper limit of the aforementioned range, on the other hand, the Si grains may be heated to a temperature exceeding the melting point of Si, and hence melted parts of unnitrided Si partially remain after the nitriding treatment, to unpreferably form unnitrided defects in the next sintering step. The two stages of nitriding are generally carried out by continuous heating.

The fourth step, i.e., the sintering step of the inventive method is carried out on the nitrided compact in the normal pressure non-oxidizing atmosphere containing nitrogen in the temperature range of 1600 to 1800° C. In this sintering process, the fine α-phase $Si_3N_4$ grains formed in the aforementioned nitrided compact are converted to fine columnar β-phase crystal grains, to form a network structure mainly composed of these grains. In the grain boundary phase mainly composed of the aforementioned subsidiary component, crystallization progresses in a cooling process after the sintering, to provide a silicon nitride sintered body having excellent wear resistance. The sintering temperature is set in the aforementioned range since the quantity of formation of a liquid phase mainly composed of the subsidiary component is so small that densification is insufficient if the temperature is less than 1600° C. while $Si_3N_4$ or SIALON forming the main component is thermally decomposed to lead to abnormal grain growth if the temperature exceeds 1800° C. Therefore, desired bending strength cannot be attained unless the sintering step is carried out within the aforementioned temperature range.

The non-oxidizing atmosphere containing nitrogen employed for the primary and secondary nitriding and sintering steps may contain ammonia gas or another inert gas, in addition to nitrogen. The content of carbon monoxide gas (hereinafter referred to as CO gas) in this atmosphere is preferably not more than 1000 ppm. If the CO gas content exceeds 1000 ppm, the oxide containing Si existing on the surfaces of the main component grains is reduced to readily change to subliming SiO. If $SiO_2$ films on the surfaces of the Si grains are thus reduced, neither nitriding reaction nor refinement of the nitrided grains is accelerated and uncontrollable in the nitriding step due to gasification of volatile SiO, and progress of sintering in the sintering step may be retarded.

EXAMPLE 1

Main component Si powder of 10 μm in mean grain size, main component $Si_3N_4$ powder of 0.5 μm in mean grain size having an α-phase content of 95 percent and subsidiary component powder of not more than 1 μm in mean grain size were weighed out in combinations and compositions shown in Table 1 respectively, paraffin was added by 4 percent by weight with respect to the total quantity of each combination, and the obtained materials were crushed and mixed in ethyl alcohol with a ball mill. The crushed slurries were dried and granulated with a spray drier, to obtain granules. The mean grain size of the granules was about 120 μm in each sample. The obtained granulated powder was dry-shaped into 46 mm in length, 8 mm in width and 5 mm in thickness, and arranged in a refractory case of carbon having inner walls coated with boron nitride (BN), and thereafter primarily and secondarily nitrided and sintered in a normal pressure nitrogen atmosphere through temperature and time programs shown in Table 1. The quantity of CO gas contained in the atmosphere was 500 ppm.

40 specimens were prepared for each sample, whereby 10 specimens were treated under the same conditions up to the secondary nitriding and then taken out from a furnace to prepare nitrided compacts described below. The remaining 30 specimens were treated through a continues heating program in the primary and secondary nitriding and sintering steps. As to each nitrided compact obtained in the aforementioned manner, shapes of nitrided grains contained therein were observed with a scanning electron microscope, and the ratio of α-phase $Si_3N_4$ grains forming the main component was confirmed by X-ray analysis. The ratio of the α-phase $Si_3N_4$ grains was calculated by trial from the ratio of the total sum of peak-heights of (102) and (210) diffraction lines of α-$Si_3N_4$ to that of peak-heights of (101) and (210) diffraction lines of β-$Si_3N_4$. When the sizes of the nitride grains forming the nitrided compacts were confirmed, it was found that samples Nos. 7 to 9 in which the Si powder serving as the starting main material was partially replaced by $Si_3N_4$ powder by quantities corresponding to about 30 percent by weight in terms of $Si_3N_4$ has higher α-phase contents as compared with a sample 4 having the same subsidiary component quantity with a starting main material entirely prepared from Si powder, in particular.

As to each sintered body, on the other hand, the shapes, sizes and the distributed state of the main component grains were confirmed by structural observation with a scanning electron microscope, and the ratio of the α-phase to the β-phase was confirmed by X-ray diffraction. Then, a bending strength specimen was prepared as to each sample, for confirming relative density (ratio of actual density measured by the Archimedean method to theoretical density) and three-point bending strength based on Japanese Industrial Standards. Table 2 shows the results. Referring to Table 1, the numerical values in the "mixed composition" columns except those in the "molar ratio" column are in units of percent by weight, and the contents of Si powder are in terms of the corresponding weight percentages of $Si_3N_4$. The numerical values in the "molar ratio" column indicate the ratios of the first components to the second components in the added subsidiary components. Further, the compounds in the "rest" column are subsidiary components not belonging to the first and second components defined in relation to the present invention. The Vickers hardness of the sintered body of each inventive sample was at least 1500 $kgf/mm^2$.

TABLE 1

| | Mixed Composition (Numerals other than molar ratios are in units of wt. %) | | | | | | Nitriding Conditions | | | | Sintering Conditions | |
|---|---|---|---|---|---|---|---|---|---|---|---|---|
| | Main Component | | Subsidiary Component | | | | Primary | | Secondary | | | |
| | | | | | | | Temperature | Time | Temperature | Time | Temperature | Time |
| No. | Si | $Si_3N_4$ | First | | Second | Molar Ratio | Rest | (° C.) | (Hr) | (° C.) | (Hr) | (° C.) | (Hr) |
| *1 | 73 | — | 27 | CaO | $Sm_2O_3$ | 4/1 | — | 1250 | 2 | 1370 | 2 | 1700 | 2 |
| 2 | 75 | — | 25 | CaO | $Sm_2O_3$ | 4/1 | — | 1250 | 2 | 1370 | 2 | 1700 | 2 |
| 3 | 85 | — | 15 | CaO | $Sm_2O_3$ | 4/1 | — | 1250 | 2 | 1370 | 2 | 1700 | 2 |
| 4 | 90 | — | 10 | CaO | $Sm_2O_3$ | 4/1 | — | 1250 | 2 | 1370 | 2 | 1700 | 2 |
| 5 | 98 | — | 2 | CaO | $Sm_2O_3$ | 4/1 | — | 1250 | 2 | 1370 | 2 | 1700 | 2 |

TABLE 1-continued

| | Mixed Composition (Numerals other than molar ratios are in units of wt. %) | | | | | | Nitriding Conditions | | | | Sintering Conditions | |
|---|---|---|---|---|---|---|---|---|---|---|---|---|
| | Main Component | | Subsidiary Component | | | | Primary | | Secondary | | | |
| | | | | | | | Temperature | Time | Temperature | Time | Temperature | Time |
| No. | Si | $Si_3N_4$ | First | Second | Molar Ratio | Rest | (° C.) | (Hr) | (° C.) | (Hr) | (° C.) | (Hr) |
| *6 | 99 | — | 1 | CaO | $Sm_2O_3$ | 4/1 | — | 1250 | 2 | 1370 | 2 | 1700 | 2 |
| 7 | 86 | 4 | 10 | CaO | $Sm_2O_3$ | 4/1 | — | 1250 | 2 | 1370 | 2 | 1700 | 2 |
| 8 | 81 | 9 | 10 | CaO | $Sm_2O_3$ | 4/1 | — | 1250 | 2 | 1370 | 2 | 1700 | 2 |
| 9 | 63 | 27 | 10 | CaO | $Sm_2O_3$ | 4/1 | — | 1250 | 2 | 1370 | 2 | 1700 | 2 |
| 10 | 61 | 29 | 10 | CaO | $Sm_2O_3$ | 4/1 | — | 1250 | 2 | 1370 | 2 | 1700 | 2 |
| *11 | 90 | — | 10 | CaO | $Sm_2O_3$ | 4/5 | — | 1250 | 2 | 1370 | 2 | 1700 | 2 |
| 12 | 90 | — | 10 | CaO | $Sm_2O_3$ | 1/1 | — | 1250 | 2 | 1370 | 2 | 1700 | 2 |
| 13 | 90 | — | 10 | CaO | $Sm_2O_3$ | 2/1 | — | 1250 | 2 | 1370 | 2 | 1700 | 2 |
| 14 | 90 | | 10 | CaO | $Sm_2O_3$ | 6/1 | — | 1250 | 2 | 1370 | 2 | 1700 | 2 |
| *15 | 90 | — | 10 | CaO | $Sm_2O_3$ | 7/1 | — | 1250 | 2 | 1370 | 2 | 1700 | 2 |
| *16 | 90 | — | 10 | MgO | $La_2O_3$ | 2/1 | — | 1190 | 2 | 1370 | 2 | 1700 | 2 |
| 17 | 90 | | 10 | MgO | $La_2O_3$ | 2/1 | — | 1200 | 2 | 1370 | 2 | 1700 | 2 |
| 18 | 90 | — | 10 | MgO | $La_2O_3$ | 2/1 | | 1320 | 2 | 1370 | 2 | 1700 | 2 |
| 19 | 90 | — | 10 | MgO | $La_2O_3$ | 2/1 | — | 1340 | 2 | 1370 | 2 | 1700 | 2 |
| 20 | 90 | — | 10 | MgO | $La_2O_3$ | 2/1 | — | 1230 | 2 | 1340 | 2 | 1700 | 2 |
| 21 | 90 | — | 10 | MgO | $La_2O_3$ | 2/1 | — | 1230 | 2 | 1350 | 2 | 1700 | 2 |
| 22 | 90 | — | 10 | MgO | $La_2O_3$ | 2/1 | | 1230 | 2 | 1400 | 2 | 1700 | 2 |
| *23 | 90 | — | 10 | MgO | $La_2O_3$ | 2/1 | — | 1230 | 2 | 1420 | 2 | 1700 | 2 |
| 24 | 90 | — | 10 | MgO | $La_2O_3$ | 2/1 | — | — | — | 1400 | 2 | 1700 | 2 |
| 25 | 90 | | 10 | MgO | $La_2O_3$ | 2/1 | | 1320 | 2 | — | — | 1700 | 2 |
| *26 | 90 | | 10 | MgO | $La_2O_3$ | 2/1 | | 1230 | 2 | 1340 | 2 | 1580 | 2 |
| 27 | 90 | — | 10 | MgO | $La_2O_3$ | 2/1 | — | 1230 | 2 | 1340 | 2 | 1600 | 2 |
| 28 | 90 | — | 10 | MgO | $La_2O_3$ | 2/1 | — | 1230 | 2 | 1340 | 2 | 1700 | 2 |
| 29 | 90 | — | 10 | MgO | $La_2O_3$ | 2/1 | — | 1230 | 2 | 1340 | 2 | 1800 | 2 |
| *30 | 90 | — | 10 | MgO | $La_2O_3$ | 2/1 | — | 1230 | 2 | 1340 | 2 | 1820 | 2 |
| 31 | 90 | | 10 | $Na_2Co_3$ | $La_2O_3$ | 2/1 | | 1220 | 2 | 1360 | 2 | 1720 | 2 |
| 32 | 90 | | 10 | $K_2O$ | $Yb_2O_3$ | 2/1 | | 1220 | 2 | 1360 | 2 | 1720 | 2 |
| 33 | 90 | — | 10 | $SrC_2O_4$ | $CeO_2$ | 2/1 | — | 1240 | 2 | 1380 | 2 | 1750 | 2 |
| 34 | 90 | — | 10 | MgO SrO | $Y_2O_3$ | 2/1 | — | 1220 | 2 | 1370 | 2 | 1730 | 2 |
| 35 | 90 | — | 10 | SrO | $Y_2O_3$ $Sm_2O_3$ | 2/1 | — | 1220 | 2 | 1350 | 2 | 1730 | 2 |
| 36 | 90 | — | 10 | MgO | $Y_2O_3$ | 2/1 | $Al_2O_3$ | 1200 | 2 | 1320 | 2 | 1700 | 2 |
| 37 | 90 | — | 10 | MgO | $Y_2O_3$ | 2/1 | AlN | 1200 | 2 | 1330 | 2 | 1720 | 2 |
| 38 | 90 | — | 10 | MgO | $Y_2O_3$ | 2/1 | $TiO_2$ | 1200 | 2 | 1330 | 2 | 1720 | 2 |

Note 1: Asterisked numerals indicate comparative samples.
Note 2: Si contents in the mixed composition columns are in terms of $Si_3N_4$.
Note 3: Numerical values of subsidiary components in the mixed composition columns indicate total quantities, and MgO and SrO in the sample No. 34 and $Y_2O_3$ and $Sm_2O_3$ in the sample No. 35 are in equal weight ratios.
Note 4: The content of the component in the "rest" column is 1 percent by weight with respect to the total weight of 100% of the main and subsidiary components in each of the samples Nos. 36 to 38.

TABLE 2

| | Nitrided Compact | | Sintered Body | | | | | |
|---|---|---|---|---|---|---|---|---|
| | | | | Breadth | | Length | | |
| No. | Shape, Size and Homogeneity of Nitrided Grains | Ratio of α-phase (%) | Relative Density (%) | Mean Value ($\mu$m) | Mean Value ($\mu$m) | Standard Deviation ($\mu$m) | Ratio of β-phase (%) | Bending Strength (kg/mm$^2$) |
| *1 | including coarse grains, heterogeneous | 90 | 97 | 0.9 | 3.2 | 1.7 | 100 | 75 |
| 2 | spherical, fine and homogeneous | 91 | 99 | 0.6 | 2.5 | 0.7 | 100 | 105 |
| 3 | spherical, fine and homogeneous | 91 | 99 | 0.4 | 2.1 | 0.5 | 100 | 120 |
| 4 | spherical, fine and homogeneous | 88 | 99 | 0.4 | 2.0 | 0.6 | 100 | 110 |
| 5 | spherical, fine and homogeneous | 84 | 99 | 0.6 | 2.5 | 1.0 | 100 | 98 |
| *6 | fibrous and heterogeneous | 78 | 85 | 0.8 | 2.8 | 1.6 | 100 | 68 |
| 7 | spherical, fine and homogeneous | 93 | 99 | 0.4 | 2.3 | 0.7 | 100 | 110 |
| 8 | spherical, fine and homogeneous | 95 | 99 | 0.4 | 2.3 | 0.5 | 100 | 120 |
| 9 | spherical, fine and homogeneous | 96 | 98 | 0.4 | 2.3 | 0.4 | 100 | 125 |
| 10 | spherical, fine and homogeneous | 96 | 97 | 0.4 | 2.4 | 0.6 | 100 | 115 |
| *11 | crushed and heterogeneous | 70 | 80 | 1.6 | 3.0 | 1.9 | 100 | 75 |
| 12 | spherical, fine and homogeneous | 85 | 95 | 0.9 | 2.1 | 0.8 | 100 | 95 |
| 13 | spherical, fine and homogeneous | 90 | 99 | 0.6 | 2.2 | 0.7 | 100 | 100 |
| 14 | spherical, fine and homogeneous | 90 | 97 | 0.6 | 2.2 | 0.8 | 100 | 95 |

TABLE 2-continued

| | | Nitrided Compact | | Sintered Body | | | | |
|---|---|---|---|---|---|---|---|---|
| | | | | Breadth | Length | | | |
| No. | Shape, Size and Homogeneity of Nitrided Grains | Ratio of α-phase (%) | Relative Density (%) | Mean Value (μm) | Mean Value (μm) | Standard Deviation (μm) | Ratio of β-phase (%) | Bending Strength (kg/mm$^2$) |
|---|---|---|---|---|---|---|---|---|
| *15 | spherical, coarse and homogeneous | 90 | 90 | 1.1 | 3.0 | 1.5 | 100 | 80 |
| *16 | crushed and heterogeneous | 82 | 94 | 1.1 | 1.9 | 1.2 | 100 | 78 |
| 17 | spherical, fine and homogeneous | 85 | 99 | 0.5 | 2.0 | 0.8 | 100 | 95 |
| 18 | spherical, fine and homogeneous | 85 | 99 | 0.5 | 2.0 | 0.8 | 100 | 95 |
| 19 | spherical, fine and homogeneous | 86 | 99 | 0.5 | 2.0 | 0.8 | 100 | 95 |
| 20 | spherical, fine and homogeneous | 85 | 99 | 0.5 | 2.0 | 0.8 | 100 | 95 |
| 21 | spherical, fine and homogeneous | 88 | 99 | 0.5 | 2.0 | 1.0 | 100 | 97 |
| 22 | spherical, fine and homogeneous | 88 | 99 | 0.5 | 2.0 | 1.0 | 100 | 97 |
| *23 | including coarse grains, heterogeneous | 75 | 90 | 1.2 | 3.1 | 1.6 | 100 | 78 |
| *24 | including coarse grains, heterogeneous | 72 | 89 | 1.5 | 2.0 | 0.8 | 100 | 75 |
| *25 | including coarse grains, heterogeneous | 75 | 89 | 1.5 | 2.0 | 0.8 | 100 | 76 |
| *26 | spherical, fine and homogeneous | 87 | 78 | 0.4 | 1.6 | 0.6 | 80 | 70 |
| 27 | spherical, fine and homogeneous | 87 | 90 | 0.5 | 1.8 | 0.8 | 90 | 100 |
| 28 | spherical, fine and homogeneous | 87 | 90 | 0.5 | 2.0 | 1.0 | 100 | 102 |
| 29 | spherical, fine and homogeneous | 87 | 99 | 0.6 | 2.2 | 1.0 | 100 | 102 |
| *30 | spherical, fine and homogeneous | 87 | 76 | 1.5 | 3.1 | 1.8 | 100 | 82 |
| 31 | spherical, fine and homogeneous | 89 | 99 | 0.5 | 2.0 | 0.9 | 100 | 99 |
| 32 | spherical, fine and homogeneous | 93 | 98 | 0.4 | 2.1 | 0.8 | 100 | 99 |
| 33 | spherical, fine and homogeneous | 87 | 99 | 0.5 | 1.9 | 0.7 | 100 | 98 |
| 34 | spherical, fine and homogeneous | 85 | 99 | 0.6 | 2.2 | 0.8 | 100 | 88 |
| 35 | spherical, fine and homogeneous | 92 | 99 | 0.5 | 2.0 | 0.9 | 100 | 99 |
| 36 | spherical, fine and homogeneous | 87 | 99 | 0.9 | 2.1 | 1.0 | 100 | 98 |
| 37 | spherical, fine and homogeneous | 87 | 99 | 0.6 | 2.0 | 1.0 | 100 | 98 |
| 38 | spherical, fine and homogeneous | 88 | 99 | 0.7 | 2.0 | 1.0 | 100 | 98 |

Note: Asterisked numerals indicate comparative samples.

From the results shown in Table 2, the following facts are understood:

(1) Assuming that the mixed weight ratio of the main component material Si in terms of $Si_3N_4$ is the rest in the starting material mixture, the total content of the subsidiary component is 2 to 25 percent by weight. The distribution width of the sizes of crystal grains consisting of $Si_3N_4$ and/or SIALON is reduced and the standard deviation of the lengths of the grains can be rendered not more than 1.5 μm when prepared successively through a step (refer to samples Nos. 1 to 15) of obtaining a mixture in a composition with first and second components forming the subsidiary component in the starting raw material in a molar ratio in the range of 1:1 to 6:1, a step (refer to samples Nos. 16 to 25) of primarily nitriding a compact of the mixture in a non-oxidizing atmosphere containing nitrogen in the temperature range of 1200 to 1320° C. and secondarily nitriding the compact in the same atmosphere in the temperature range of 1350 to 1400° C., and a step (refer to samples Nos. 26 to 30) of sintering the compact in the non-oxidizing atmosphere containing nitrogen in the temperature range of 1600 to 1800° C. Consequently obtained is a silicon nitride sintered body having excellent mechanical strength and abrasion resistance, which consists of a three-dimensional network structure mainly formed by fine columnar grains.

(2) When the main component of the starting material formed by Si powder is partially replaced with $Si_3N_4$ powder by not more than 30 percent by weight of the total quantity of the starting material mixture in terms of $Si_3N_4$, formation of fine spherical α-phase grains is accelerated in the nitriding reaction process, to reliably provide a sintered body having bending strength of at least 100 kg/mm$^2$ as a result (compare a sample No. 4 with samples Nos. 7 to 10).

(3) Through the aforementioned material mixing and nitriding steps, it is possible to obtain a nitrided compact consisting of spherical and fine nitrided grains mainly composed of an α-phase having relatively homogeneous sizes. Consequently obtained is a silicon nitride sintered body having the aforementioned excellent characteristics.

(4) The aforementioned effects of the present invention are attained also when the subsidiary components are changed in the inventive range (refer to samples Nos. 13, 17 and 31 to 35, for example) or a third subsidiary component is additionally mixed as needed (refer to samples Nos. 36 to 38).

EXAMPLE 2

Samples of the unnitrided compact of the sample No. 17 in Example 1 were treated under various nitriding and sintering conditions shown in Table 3. The obtained nitrided compacts and sintered bodies were evaluated in relation to contents similar to those in Example 1. Table 4 shows the results.

TABLE 3

| | Nitriding Conditions | | | | | | Sintering Conditions | | | |
|---|---|---|---|---|---|---|---|---|---|---|
| | Primary | | Secondary | | Atmosphere | | | | Atmosphere | |
| No. | Temperature (° C.) | Time (Hr.) | Temperature (° C.) | Time (Hr) | Nitrogen Pressure (atm) | CO Quantity (ppm) | Temperature (° C.) | Time (Hr.) | Nitrogen Pressure (atm) | CO Quantity (ppm) |
| 39 | 1200 | 2 | 1370 | 2 | 1 | 80 | 1700 | 2 | 1 | 80 |
| 40 | 1200 | 2 | 1370 | 2 | 1 | 100 | 1700 | 2 | 1 | 100 |
| 41 | 1200 | 2 | 1370 | 2 | 1 | 300 | 1700 | 2 | 1 | 300 |
| 42 | 1200 | 2 | 1370 | 2 | 1 | 600 | 1700 | 2 | 1 | 600 |
| 43 | 1200 | 2 | 1370 | 2 | 1 | 1000 | 1700 | 2 | 1 | 1000 |
| 44 | 1200 | 2 | 1370 | 2 | 1 | 1100 | 1700 | 2 | 1 | 1100 |
| 45 | 1200 | 2 | 1370 | 2 | 2 | 300 | 1700 | 2 | 1 | 300 |
| 46 | 1206 | 2 | 1370 | 2 | 5 | 300 | 1700 | 2 | 1 | 300 |
| 47 | 1200 | 2 | 1370 | 2 | 10 | 300 | 1700 | 2 | 1 | 300 |

TABLE 4

| | Nitrided Compact | | | Sintered Body | | | | | |
|---|---|---|---|---|---|---|---|---|---|
| | | | | | Length | | | | |
| No. | Shape, Size and Homogeneity of Nitrided Grains | Ratio of α-phase (%) | Relative Density % | Mean Value (μm) | Mean Value (μm) | Standard Deviation (μm) | Ratio of β-phase (%) | Bending Strength (kg/mm$^2$) |
| 39 | spherical, fine and homogeneous | 85 | 99 | 0.5 | 2.0 | 0.8 | 100 | 95 |
| 40 | spherical, fine and homogeneous | 85 | 99 | 0.5 | 2.0 | 0.8 | 100 | 95 |
| 41 | spherical, fine and homogeneous | 85 | 99 | 0.5 | 2.0 | 0.8 | 100 | 95 |
| 42 | spherical, fine and homogeneous | 85 | 99 | 0.5 | 2.0 | 0.8 | 100 | 95 |
| 43 | spherical, fine and homogeneous | 83 | 96 | 0.7 | 2.2 | 1.2 | 100 | 88 |
| 44 | spherical, fine and homogeneous | 81 | 94 | 0.8 | 2.6 | 1.4 | 100 | 85 |
| 45 | spherical, fine and homogeneous | 85 | 99 | 0.5 | 2.0 | 0.8 | 100 | 97 |
| 46 | spherical, fine and homogeneous | 85 | 99 | 0.5 | 2.0 | 0.8 | 100 | 105 |
| 47 | spherical, fine and homogeneous | 85 | 99 | 0.5 | 2.0 | 0.8 | 100 | 108 |

From the results shown in Table 4, the following facts are understood:

(1) When the content of CO gas in the atmosphere for the nitriding and sintering steps is suppressed to not more than 1000 ppm, the lengths of the grains are reduced after sintering, and dispersion thereof is also reduced.

(2) When the nitrogen pressure in the atmosphere for the nitriding and sintering steps is increased, a sintered body having higher bending strength can be obtained after sintering.

(Example 3: Comparison with Method disclosed in Japanese Patent ing-Open No. 8-310868)

The same Si powder as that in Example 1 was prepared as the main component material, and CaO powder and $Sm_2O_3$ powder were prepared as susidiary component materials identically to Example 1. The Si powder was previously cleaned in water of pH 5 and heated in an oxygen atmosphere at 500° C. for 2 hours, to prepare heat-treated Si powder having unpaired electron concentration of $8 \times 10^{15}/cm^3$. Further, subsidiary component powder was prepared by mixing the CaO powder with the $Sm_2O_3$ powder in a molar ratio of 2:1. Thereafter the aforementioned Si powder and the aforementioned heat-treated Si powder in quantities corresponding to 90 percent by weight in terms of $S_3N_4$ were mixed with the subsidiary component powder of 10 percent by weight, to prepare two types of mixed powder materials having the same components and compositions with different Si materials. These two types of mixtures were homogeneously crushed and mixed similarly to Example 1, to obtain granulated compacts. These compacts were heat-treated in a normal pressure nitrogen atmosphere having a CO gas content of 500 ppm under nitriding and sintering conditions shown in Table 5 respectively. The nitriding and sintering steps were carried out through a continuous program. Samples Nos. 48 and 49 were nitrided and sintered under conditions within the inventive ranges and in the ranges disclosed in Japanese Patent Laying-Open No. 8-310868 respectively. These samples were evaluated in relation to the same contents as Example 1 in the stages of nitrided compacts and sintered bodies respectively. Table 6 shows the results.

TABLE 5

| | Mixed Composition (numerical values other than molar ratios are in units of wt. %) | | | | | Nitriding Conditions | | | | Sintering Conditions | |
|---|---|---|---|---|---|---|---|---|---|---|---|
| | Main Component | | | | | Primary | | Secondary | | | |
| No. | Si | Heat-Treated Si | Subsidiary Component | | Molar Ratio | Temperature (° C.) | Time (Hr) | Temperature (° C.) | Time (Hr) | Temperature (° C.) | Time (Hr) |
| | | | First | Second | | | | | | | |
| 48 | 90 | — | 10 CaO | Sm$_2$O$_3$ | 2/1 | 1250 | 2 | 1370 | 2 | 1700 | 3 |
| *49 | 90 | | 10 CaO | Sm$_2$O$_3$ | 2/1 | — | — | 1370 | 2 | 1700 | 3 |

Note: Asterisked numeral indicates comparative sample, and the indications in the mixed composition columns follow those in Table 1.

TABLE 6

| | Nitrided Compact | | | Sintered Body | | | | |
|---|---|---|---|---|---|---|---|---|
| | | | | | Length | | | |
| No. | Shape, Size and Homogeneity of Nitrided Grains | Ratio of α-phase (%) | Relative Density % | Mean Value (μm) | Mean Value (μm) | Standard Deviation (μm) | Ratio of β-phase (%) | Bending Strength (kg/mm$^2$) |
| 48 | spherical, fine and homogeneous | 85 | 99 | 0.5 | 2.0 | 0.8 | 100 | 100 |
| *49 | including coarse grains, heterogeneous | 82 | 99 | 1.0 | 3.2 | 1.8 | 100 | 85 |

Note: Asterisked numeral indicates comparative sample.

It is clearly understood from the results shown in Table 6 that a nitrided compact having a high α-phase ratio was obtained through single-stage nitriding in the sample No. 49 prepared by previously cleaning the Si powder with weak acid water and heating/oxidizing grain surfaces for accelerating nitriding reaction, while dispersion of the crystal grain sizes was increased after sintering as compared with the inventive sample, to result in inferior bending strength to the inventive sample.

EXAMPLE 4

Specimens were cut out from the sintered bodies of the samples Nos. 1, 4, 6 and 8 of Example 1, and subjected to roller chip frictional abrasion test. In this test, a single surface of each specimen 1 was polished with diamond abrasive grains of #500 and then the polished surface was arranged under a roller 2 of SUJ2 (bearing steel) with a load 3 of 21.7 kg to be in contact with the roller 2, as typically shown in FIG. 1. Thereafter the roller 2 was rotated/slid on the polished surface under sliding conditions of 2000 m in sliding distance and 3.08 m/sec. in sliding speed. In this case, the slid part was lubricated with class CC engine oil of SAE#30. After the test, the wear amount was measured for calculating specific wear rate by trial through a calculation formula of "specific wear rate=wear amount/(load×sliding distance)". Table 7 shows the results. It is understood from these results that the inventive samples are superior in wear resistance to the comparative samples.

TABLE 7

| No. | Sintered Body Sample No. | Wear Amount (mm$^3$) | Specific Wear Rate (× 10$^{-10}$ kgf · mm$^3$) |
|---|---|---|---|
| *50 | 1 | 0.010 | 2.3 × 10$^{-10}$ |
| 51 | 4 | 0.002 | 4.6 × 10$^{-11}$ |
| *52 | 6 | 0.012 | 2.8 × 10$^{-10}$ |
| 53 | 8 | 0.002 | 4.6 × 10$^{-11}$ |

Note: Asterisked numerals indicate comparative samples.

According to the present invention, it is possible to nitride and sinter the material in a normal pressure non-oxidizing atmosphere containing nitrogen in a short time neither with nitriding over a long time or under a high pressure nor with specific pretreatment of Si powder dissimilarly to any conventional method, for providing a reactively sintered silicon nitride sintered body which is lower in cost than the conventional one, homogenous and dense, and excellent in mechanical strength and wear resistance, and a readily sinterable nitrided compact which is an intermediate therefor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A silicon nitride sintered body, that is obtained by nitriding and sintering a silicon (Si) starting material, and that consists of crystal grains and a grain boundary phase, wherein said crystal grains are mainly composed of at least one of silicon nitride (Si$_3$N$_4$) and SIALON, said grain boundary phase contains a first component including at least one element selected from a group of sodium (Na), potassium (K), magnesium (Mg), calcium (Ca) and strontium (Sr) and a second component including at least one element selected from a group of yttrium (Y) and lanthanoid series elements (La), the molar ratio of said first component to said second component is in the range of 1:1 to 6:1 in terms of oxides thereof, the mean breadth of said crystal grains is at least 0.4 $\mu$m and not more than 1 $\mu$m, the mean length of said crystal grains is not more than 3 $\mu$m, and the standard deviation of said mean length of said crystal grains is not more than 1.5 $\mu$m.

2. The silicon nitride sintered body in accordance with claim 1, wherein said grain boundary phase contains at least one element selected from a group of Al, N, O and Ti.

3. The silicon nitride sintered body in accordance with claim 1, obtained by sintering a nitrided compact that was obtained by nitriding said silicon (Si) starting material, wherein said nitrided compact contained $Si_3N_4$ grains that were spherical and had a mean grain size smaller than that of grains of said silicon starting material.

4. The silicon nitride sintered body in accordance with claim 3, wherein a crystal phase of said $Si_3N_4$ grains contained at least 80 percent of an α-phase and not more than 20 percent of a β-phase.

5. A method of preparing the silicon nitride sintered body according to claim 1, comprising steps of:

preparing a mixed powder by mixing a main component powder containing Si powder or a mixture of Si powder and $Si_3N_4$ powder in a quantity corresponding to 75 to 98 percent by weight in terms of $Si_3N_4$ with 2 to 25 percent by weight in total of a subsidiary component powder consisting of a first compound containing at least one element selected from a group of Na, K, Mg, Ca and Sr and a second compound containing at least one element selected from a group of Y and lanthanoid series elements (La) so that the molar ratio of said first compound to said second compound is in the range of 1:1 to 6:1 in terms of oxides thereof;

shaping said mixed powder into a compact;

primarily nitriding said compact in a non-oxidizing atmosphere containing nitrogen at 1200 to 1320° C. and then secondarily nitriding said compact in said non-oxidizing atmosphere containing nitrogen at 1350 to 1400° C. for obtaining a nitrided compact; and sintering said nitrided compact in said non-oxidizing atmosphere containing nitrogen at 1600 to 1800° C.

6. The method of preparing a silicon nitride sintered body in accordance with claim 5, wherein said mixed powder contains not more than 30 percent by weight of said $Si_3N_4$ powder, and the remainder of said mixed powder is said Si powder.

7. The method of preparing a silicon nitride sintered body in accordance with claim 5, wherein said atmosphere contains not more than 1000 ppm of carbon monoxide gas in said nitriding and sintering steps.

8. The method of preparing a silicon nitride sintered body in accordance with claim 5, wherein said primary nitriding and said secondary nitriding are carried out by continuous heating.

9. The method of preparing a silicon nitride sintered body in accordance with claim 5, wherein said non-oxidizing atmosphere contains at least one gas selected from a group of nitrogen, ammonia gas and inert gas.

10. The method of preparing a silicon nitride sintered body in accordance with claim 5, wherein said first compound includes at least one of CaO, MgO, $Na_2CO_3$, $K_2O$, $SrC_2O_4$ and SrO, and said second compound includes at least one of $Sm_2O_3$, $La_2O_3$, $Yb_2O_3$, $CeO_2$ and $Y_2O_3$.

11. The silicon nitride sintered body in accordance with claim 1, wherein said mean breadth of said crystal grains is not more than 0.9 $\mu$m, and said mean length of said crystal grains is not more than 2.5 $\mu$m.

12. The silicon nitride sintered body in accordance with claim 11, wherein said mean breadth is at least 0.5 $\mu$m.

13. The silicon nitride sintered body in accordance with claim 11, wherein said mean breadth is at least 0.6 $\mu$m.

14. The silicon nitride sintered body in accordance with claim 11, wherein said mean breadth is at least 0.7 $\mu$m.

15. The silicon nitride sintered body in accordance with claim 11, wherein said mean length is at least 1.8 $\mu$m.

16. The silicon nitride sintered body in accordance with claim 11, wherein said standard deviation of said mean length is not more than 1.0 $\mu$m.

17. The silicon nitride sintered body in accordance with claim 1, having a bending strength of at least 100 kg/mm$^2$.

18. The silicon nitride sintered body in accordance with claim 1, wherein said crystal grains of said sintered body consist of 100% β-phase crystal grains.

19. A silicon nitride sintered body consisting essentially of crystal grains and a grain boundary phase, wherein:

said crystal grains include at least 80 percent of β-phase crystal grains of at least one of silicon nitride and SIALON, said crystal grains have a mean breadth of at least 0.4 $\mu$m and not more than 0.9 $\mu$m, and a mean length of greater than said mean breadth and not more than 2.5 $\mu$m, with a standard deviation of said mean length being not more than 1.0 $\mu$m, and said grain boundary phase comprises a first component including at least one of Na, K, Mg, Ca and Sr, and a second component including at least one of Y and lanthanide series elements, with a molar ratio of said first component to said second component being in a range of 1:1 to 6:1 in terms of oxides of said components.

* * * * *

UNITED STATES PATENT AND TRADEMARK OFFICE
CERTIFICATE OF CORRECTION

PATENT NO. : 6,001,759
DATED : Dec. 14, 1999
INVENTOR(S) : Michimasa Miyanaga et al.

It is certified that error appears in the above-identified patent and that said Letters Patent is hereby corrected as shown below:

```
Col.  1,    line 22, after "progressed" delete "as";
Col. 13-14
Table 4, line 2, col. 4, above "%" replace "Relative Density" by
         the heading --Relative Density--;
         line 2, col. 5, above "Mean Value (µm)" by the heading
         --Breadth--;

Col. 13,    line 57, after "Patent" replace "ing-Open" by --
            Laying-Open--;
Col. 15-16
Table 6, line 2, col. 5, above "Mean Value (µm)" by the heading
         --Breadth--;
```

Signed and Sealed this

Eighth Day of August, 2000

Attest:

Q. TODD DICKINSON

*Attesting Officer*   *Director of Patents and Trademarks*